United States Patent
Kanda et al.

(10) Patent No.: US 9,054,972 B2
(45) Date of Patent: *Jun. 9, 2015

(54) METHOD AND APPARATUS FOR DETERMINING BANDWIDTH-CONSUMING FRAME FLOWS IN A NETWORK

(71) Applicant: Brocade Communications Systems, Inc., San Jose, CA (US)

(72) Inventors: Amit Kanda, San Jose, CA (US); Sathish Kumar Gnanasekaran, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,393

(22) Filed: Oct. 11, 2013

(65) Prior Publication Data

US 2014/0036717 A1    Feb. 6, 2014

Related U.S. Application Data

(63) Continuation of application No. 12/764,849, filed on Apr. 21, 2010, now Pat. No. 8,582,432, which is a continuation of application No. 11/782,894, filed on Jul. 25, 2007, now Pat. No. 7,733,805.

(51) Int. Cl.
*H04L 12/26* (2006.01)

(52) U.S. Cl.
CPC .......... *H04L 43/0894* (2013.01); *H04L 43/026* (2013.01); *Y02B 60/33* (2013.01)

(58) Field of Classification Search
None
See application file for complete search history.

(56) References Cited

U.S. PATENT DOCUMENTS

| 6,477,204 | B1 * | 11/2002 | Fukushima et al. ..... 375/240.28 |
| 7,164,657 | B2 * | 1/2007 | Phaal ........................... 370/235 |
| 7,430,203 | B2 | 9/2008 | Millet et al. |
| 7,496,661 | B1 * | 2/2009 | Morford et al. ............... 709/224 |
| 7,545,748 | B1 * | 6/2009 | Riddle ........................... 370/235 |
| 7,733,805 | B2 * | 6/2010 | Kanda et al. .................. 370/254 |
| 8,582,432 | B2 * | 11/2013 | Kanda et al. .................. 370/235 |
| 2003/0012139 | A1 | 1/2003 | Fukumoto et al. |
| 2003/0179705 | A1 | 9/2003 | Kojima |
| 2003/0214913 | A1 * | 11/2003 | Kan et al. ...................... 370/252 |
| 2004/0004961 | A1 | 1/2004 | Lakshmanamurthy et al. |
| 2005/0114700 | A1 * | 5/2005 | Barrie et al. .................. 713/201 |
| 2005/0213501 | A1 | 9/2005 | Fontana et al. |
| 2005/0270976 | A1 | 12/2005 | Yang et al. |
| 2006/0133376 | A1 | 6/2006 | Valdevit |
| 2006/0146708 | A1 | 7/2006 | Kanazawa |
| 2007/0230492 | A1 | 10/2007 | Ugai et al. |
| 2008/0201772 | A1 * | 8/2008 | Mondaeev et al. ............. 726/13 |
| 2009/0010259 | A1 | 1/2009 | Sirotkin |

* cited by examiner

*Primary Examiner* — Anh-Vu Ly
(74) *Attorney, Agent, or Firm* — Wong, Cabello, Lutsch, Rutherford & Brucculeri, L.L.P.

(57) ABSTRACT

A port monitor monitors network traffic that passes through a port of a switch. Frame flows routed through the switch are counted by hardware frame counting logic, which includes a content-addressable memory (CAM) and counters corresponding to various frame flows. Port monitor software includes logical containers ("buckets"), which are used to record and sort counts of the frame flows from hardware based on activity of the frame flows. Frame flow sorting is based on confidence building algorithms such that the thrashing of frame flows between buckets is reduced. Storage and sorting of the frame flows in software allows the activity level of any number of frame flows associated with the switch to be counted, regardless of hardware limitations on how many frame flows can be counted. This allows a real-time analysis of frame flows and a determination of frame flows that are major users of Fiber Channel bandwidth.

22 Claims, 10 Drawing Sheets

METHOD AND APPARATUS FOR DETERMINING BANDWIDTH-CONSUMING FRAME FLOWS IN A NETWORK

CROSS-REFERENCE TO RELATED APPLICATIONS

This continuation application claims priority to U.S. patent application Ser. No. 12/764,849, entitled "Method and Apparatus for Determining Bandwidth-Consuming Frame Flows in a Network," filed Apr. 21, 2010, which in turn claims priority to U.S. patent application Ser. No. 11/782,894, entitled "Method and Apparatus for Determining Bandwidth-Consuming Frame Flows in a Network," filed Jul. 25, 2007, now U.S. Pat. No. 7,733,805, both of which are hereby incorporated by reference.

BACKGROUND OF THE INVENTION

1. Field of Invention

The application relates generally to network switches, and more particularly to a network switch for determining active frame flows in a network.

2. Description of the Related Art

FIG. 1 illustrates a Fibre Channel network 100. Generally, the network 100 is connected using Fibre Channel connections. For illustrative purposes in FIG. 1, the network 100 includes a fabric 102 comprised of four different switches 110, 112, 114, and 116. It will be understood by one of skill in the art that a Fibre Channel fabric may be comprised of one or more switches.

A variety of devices can be connected to the fabric 102. A Fibre Channel fabric supports both point-to-point and loop device connections. A point-to-point connection is a direct connection between a device and the fabric. A loop connection is a single fabric connection that supports one or more devices in an "arbitrated loop" configuration, where signals travel around the loop through each of the loop devices. Hubs, bridges, and other configurations may be added to enhance the connections within an arbitrated loop.

On the fabric side, devices are coupled to the fabric via fabric ports. A fabric port (F_Port) supports a point-to-point fabric attachment. A fabric loop port (FL_Port) supports a fabric loop attachment. Both F_Ports and FL_Ports may be referred to generically as Fx_Ports. Typically, ports connecting one switch to another switch are referred to as expansion ports (E_Ports).

On the device side, each device coupled to a fabric constitutes a node. Each device includes a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

In FIG. 1, fabric 102 includes switches 110, 112, 114 and 116 that are interconnected. Switch 110 is attached to private loop 122, which is comprised of devices 124 and 126. Switch 112 is attached to device 152. A user interface 142 also connects to the fabric 102 via switch 112. Switch 114 is attached to device 170, which has two logical units 172, 174 attached to device 170. Typically, device 170 is a storage device such as a RAID device, which in turn may be logically separated into logical units illustrated as logical units 172 and 174. Alternatively the storage device 170 could be a JBOD ("just a bunch of disks") device, with each individual disk being a logical unit. Switch 116 is attached to devices 132 and 134, and is also attached to public loop 162, which is formed from devices 166 and 168 being communicatively coupled together.

Aspects of software control of network switches are disclosed in commonly assigned U.S. patent application Ser. No. 11/020,892 entitled "Multicast Transmission Protocol for Fabric Services," the subject matter of which is hereby incorporated by reference in its entirety. Further, aspects of frame filtering are disclosed in commonly assigned U.S. patent application Ser. No. 10/767,213 entitled "Fibre Channel Zoning Hardware for Directing a Data Packet to an External Processing Device," the subject matter of which is hereby incorporated by reference in its entirety.

A frame may pass from any source address to any destination address in a fabric, subject to imposed constraints such as zoning restrictions. Such a pair of communicating endpoint network addresses is known as a frame flow (a "flow"). However, particular frame flows may create more traffic across a network than others. For example, during backup of a storage resource (e.g., storage device 170), frame flows including the address of this device are more likely to be encountered and routed on fabric 102. Therefore, determination of which frame flows are present and their activity levels is desirable to detect traffic congestion causes. However, measuring frame flows is extremely difficult. Merely knowing the endpoints is insufficient, as the actual data transfer levels must also be measured. While this is simple in theory, in an actual network, the sheer number of frame flows renders the task difficult, thus limiting control of network congestion.

SUMMARY OF THE INVENTION

In general, embodiments according to the invention relate to a method and apparatus for sorting multiple frame flows in a network switch. A switch according to one or more embodiments of the invention includes port monitor hardware and software that monitors network traffic that passes through the switch on one of the ports of the switch. Specifically, selected frame flows that are routed through the switch may be monitored and counted. The port monitor hardware includes frame counting logic, which includes a content-addressable memory (CAM) and counters, and the port monitor software includes logical containers referred to as buckets, which maintain counts of frame flows corresponding to the counts in hardware.

The CAM receives frame information from frames that pass through the switch and determines which frames are to be counted. When a frame is counted, a hardware counter corresponding to the frame is incremented. At predetermined intervals, a processor queries the counters to receive a count of frame flows that are monitored and counted by the hardware frame counting logic. The software buckets are used to record and sort counts corresponding to the various frame flows based on the activity of the flows. By selectively programming which frame flows are counted by the hardware frame counting logic and storing these counts in the different buckets, the port monitor software can monitor the activity level of any number of frame flows associated with the switch, regardless of hardware limitations on how many flows can be counted.

In the software, comparisons are made between the frame flow counts in neighboring buckets at predetermined intervals. These comparisons are made in a top-to-bottom fashion such that the frame flows with relatively higher counts move to higher ranked buckets and frame flows with relatively lower counts move to lower ranked buckets. Accordingly, frame flows may be sorted based on their activity level (e.g., how many occurrences of a particular frame flow are counted). In a preferred embodiment according to the invention, the movement of frame flows between buckets is based on confidence building algorithms such that the thrashing of frame flows between buckets is reduced. These algorithms include normalizing the counts of the frame flows and sorting the normalized frame flow counts. A port monitor according to one or more embodiments of the invention allows a real-time analysis of frame flows and a determination of flows that are major users of Fibre Channel bandwidth.

Figure 1:
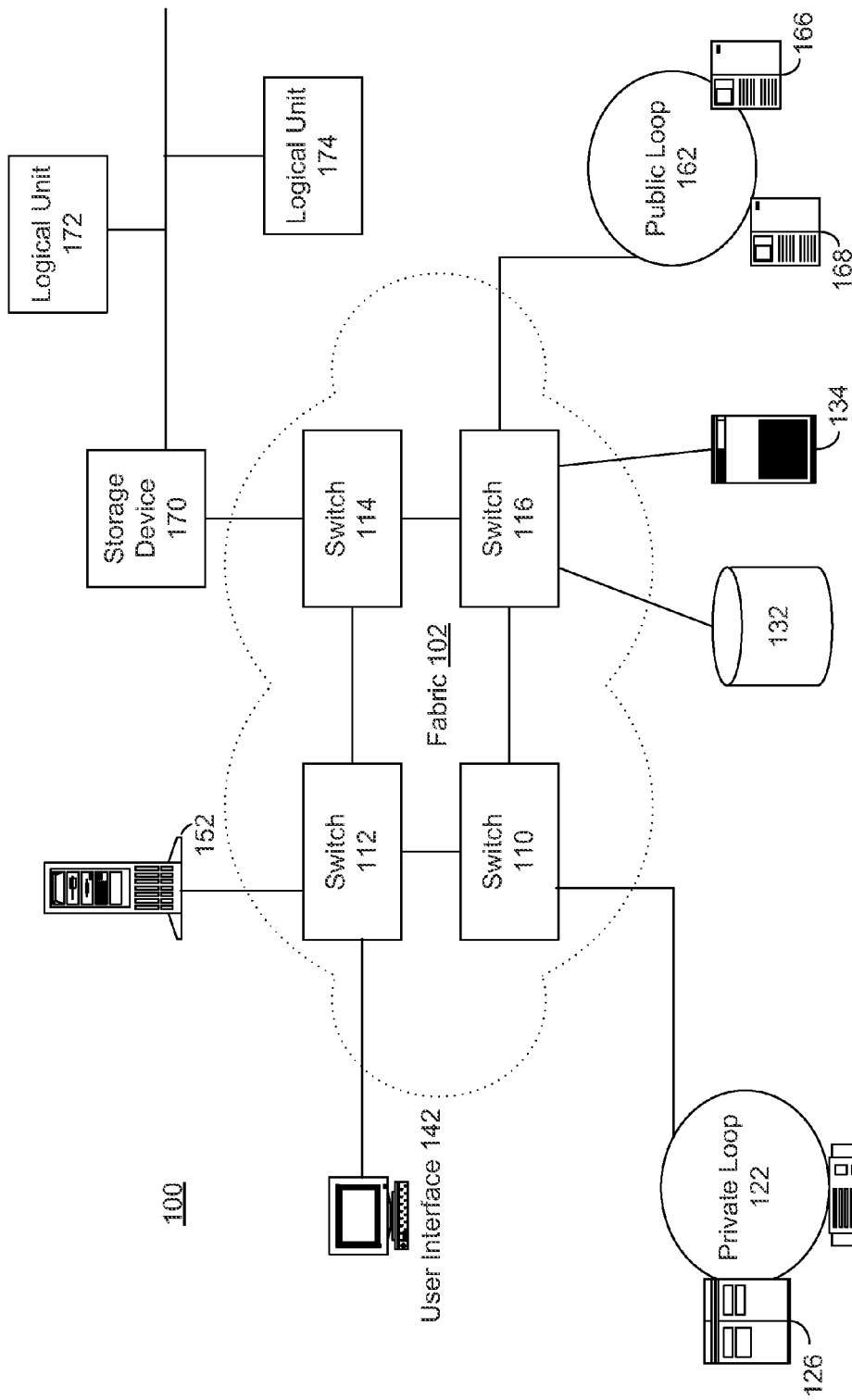
FIG. 1 illustrates a system diagram of a Fibre Channel network.

The figures depict a preferred embodiment of the invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

A system and method for determining active frame flows routed over a fabric in a Fibre Channel communications network is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or to "an embodiment" means that a particular feature, structure, or characteristic described in connection with the embodiments is included in at least one embodiment according to the invention. The appearances of the phrase "in one embodiment" in various places in the specification are not necessarily all referring to the same embodiment.

Some portions of the description that follow are presented in terms of algorithms and symbolic representations of operations on data bits within a computer memory. These algorithmic descriptions and representations are the means used by those skilled in the art to most effectively convey the substance of their work to others skilled in the art. Generally, an algorithm is a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like refer to the action and processes of a computer system or a similar electronic computing device that manipulates and transforms data represented as physical (electronic) quantities within the computer system memories or registers (or other such information storage, transmission or display devices).

The invention also relates to an apparatus for performing the operations herein. The required structure to implement the algorithms and apparatuses presented herein is discussed in the description below. This apparatus may comprise a computer program stored in the apparatus and executed by the apparatus. However, the invention is not described with reference to any particular programming language. It will be appreciated that a variety of programming languages may be used to implement the teachings of the invention as described herein. Such a computer program may be stored in a computer readable storage medium, such as, but not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, processors referred to in the specification may include a single processor or may be architectures employing multiple processor designs for increased computing capability.

Reference will now be made in detail to several embodiments of the invention, examples of which are illustrated in the accompanying drawings. Wherever practicable, the same reference numbers will be used throughout the drawings to refer to the same or like parts.

Figure 2:
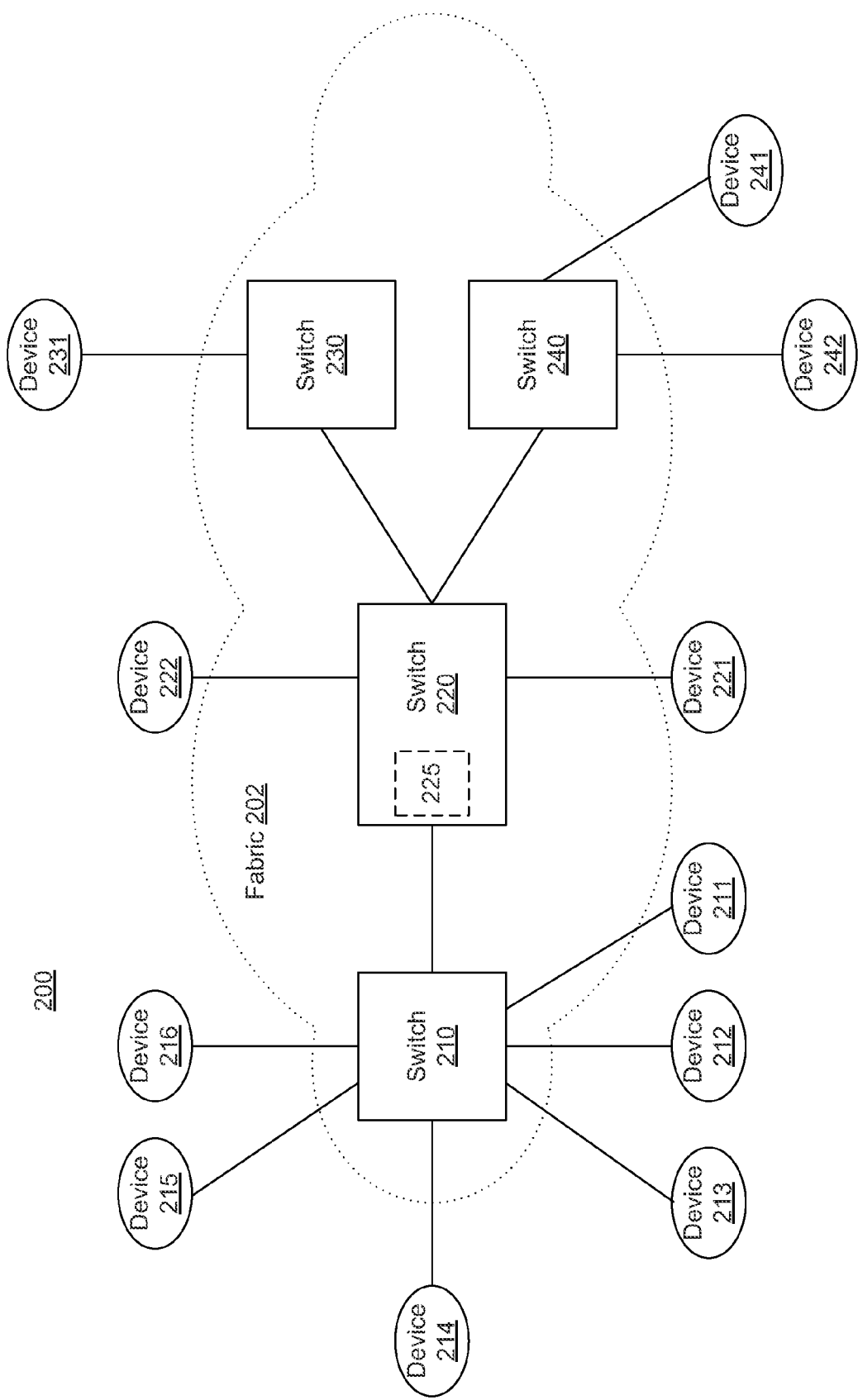
FIG. 2 illustrates a system diagram of a Fibre Channel network according to an embodiment of the invention.

FIG. 2 shows a Fibre Channel network 200 in accordance with an embodiment of the invention. Generally, the network 200 is connected using Fibre Channel connections. For illustrative purposes in FIG. 2, the network 200 includes a fabric 202 comprised of four different switches 210, 220, 230, and 240. A Fibre Channel fabric in accordance with one or more embodiments of the invention may be comprised of one or more switches. Further, although a Fibre Channel network 200 is illustrated in FIG. 2 for purposes of example, it will be understood that embodiments of the invention may similarly apply to any network protocol (e.g., Ethernet, wireless, etc.).

Each switch 210, 220, 230, 240 is connected to one or more devices 211-216, 221, 222, 231, 241, 242. While each switch is shown for illustrative purposes as having at least one point-to-point device connected, any number of point-to point or arbitrated loop devices may be connected. Further, it is not necessary that all of the switches have devices attached, but may be connected to other switches.

The switch 220 includes port monitor hardware and software (referred to generally as a "port monitor") 225. The illustrated port monitor 225 monitors network traffic on the E_Port of switch 220 that is connected to switch 210. Thus, the port monitor 225 may be viewed as separating one portion of the fabric 202 on one side of the switch 220, which includes devices 211-216, from another portion of the fabric 202 on another side of the switch, which includes all other devices connected to the fabric 202 (i.e., devices 221, 222, 231, 241, 242). All frame flows having a destination address that is one of devices 211-216 and a source address that is one of devices 221, 222, 231, 241, or 242 pass through the E_Port to which the port monitor 225 is connected (i.e., through switch 220). The port monitor 225 is configured to detect and count selected frame flows that pass through it having source and destination addresses as described above.

While the port monitor 225 is shown as detecting and counting frame flows that have a destination address that is one of devices 211-216, one skilled in the art will appreciate that monitor 225 could instead detect frame flows having one of these devices as a source address, or some combination thereof, provided that the flow passes through the port monitor 225 (i.e., the E_Port to which the port monitor 225 is attached). Further, while embodiments of the invention illustrate the port monitor 225 as being connected to an E_Port of the switch 220, the port monitor 225 may be connected to any port through which frame flows occur, including, for example, an F_Port or an FL_Port.

While a single port monitor 225 is shown for purposes of example in FIG. 2, a switch may include any number of port monitors, dependent on hardware and software resources. For example, a second port monitor 225 may be connected to the E_Port of switch 220 that is connected to switch 230. Locations for port monitors are defined and configured by a user of the switch 220 (e.g., a network system administrator).

Figure 3:
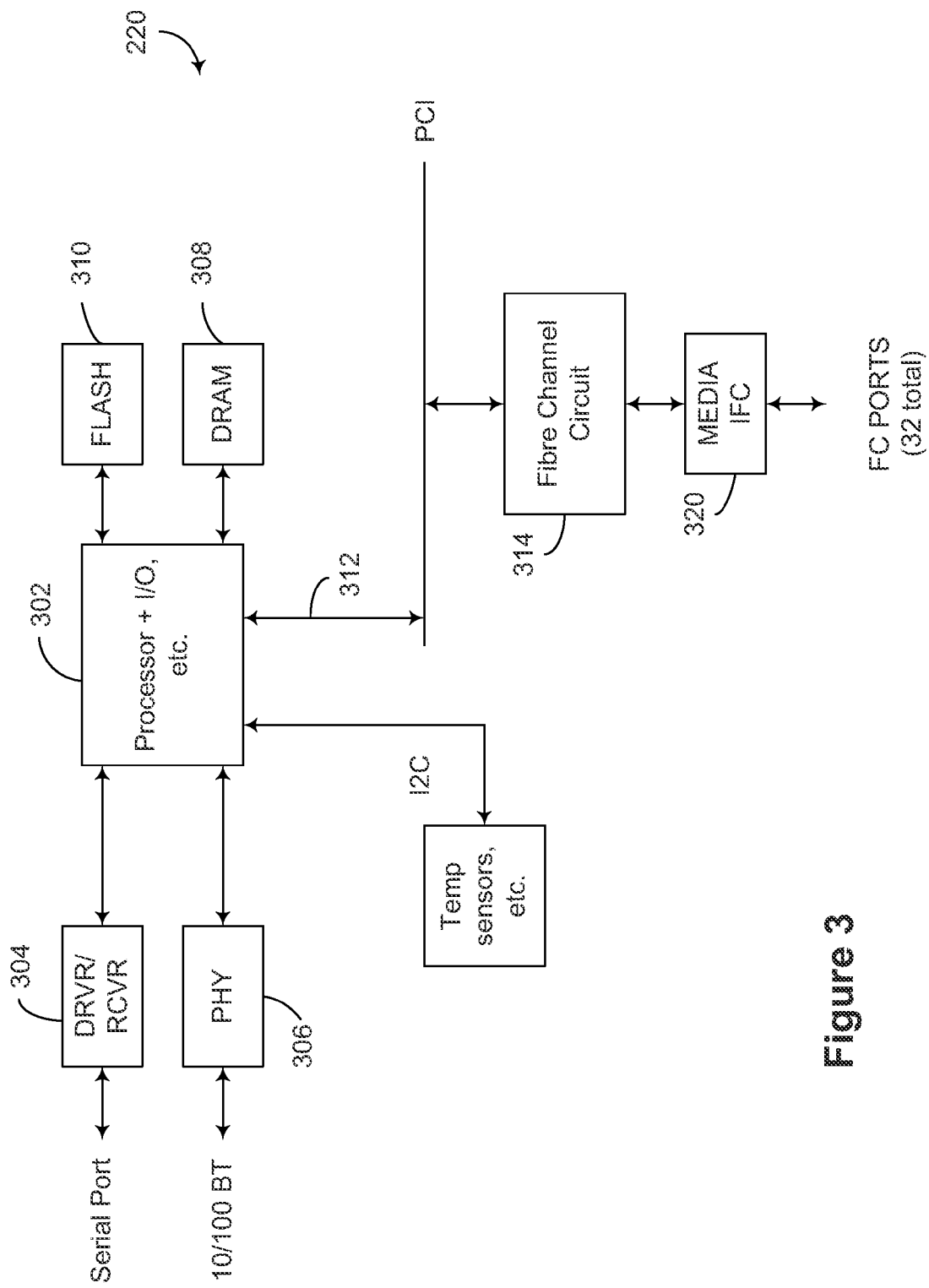
FIG. 3 is a block diagram of a switch according to an embodiment of the invention.

FIG. 3 illustrates a basic block diagram of a switch 220 according to one embodiment of the invention. A processor and I/O interface complex 302 provides processing capabilities for the switch 300. The processor may be any of various suitable processors, including the Intel i960 and the IBM PowerPC. The I/O interfaces may include low speed serial interfaces, such as RS-232, which use a driver/receiver circuit 304, or high-speed serial network interfaces, such as Ethernet, which use a PHY circuit 306 to connect to a local area network (LAN). Main memory or DRAM 308 and flash or permanent memory 310 are connected to the processor complex 302 to provide memory to control and to be used by the processor.

The processor complex 302 also includes an I/O bus interface 312, such as a PCI bus, to connect to Fibre Channel circuit 314. In one embodiment of the invention, the Fibre Channel circuit 314 contains 32 Fibre Channel ports. Each port is connected to a media interface 320, which receives the particular Fibre Channel medium used to interconnect switches used to form a fabric or to connect to various devices.

The switch 300 contains various performance monitoring capabilities. These vary with each switch, but include, for example, the ability to monitor traffic through a given port. Additionally, the switch 300 includes capabilities to monitor traffic between specific end points and other advanced items. Certain switches, such as those described in U.S. Pat. No. 7,167,472, include the ability to define a series of very flexible counters. Thus, switches can provide a great deal of data about packets they process. In embodiments of the invention, this data may be stored to DRAM 308, flash memory 310, or within the Fibre Channel circuit 314, as detailed below. Data may additionally be stored to a hard disk drive (not shown).

Figure 4A:
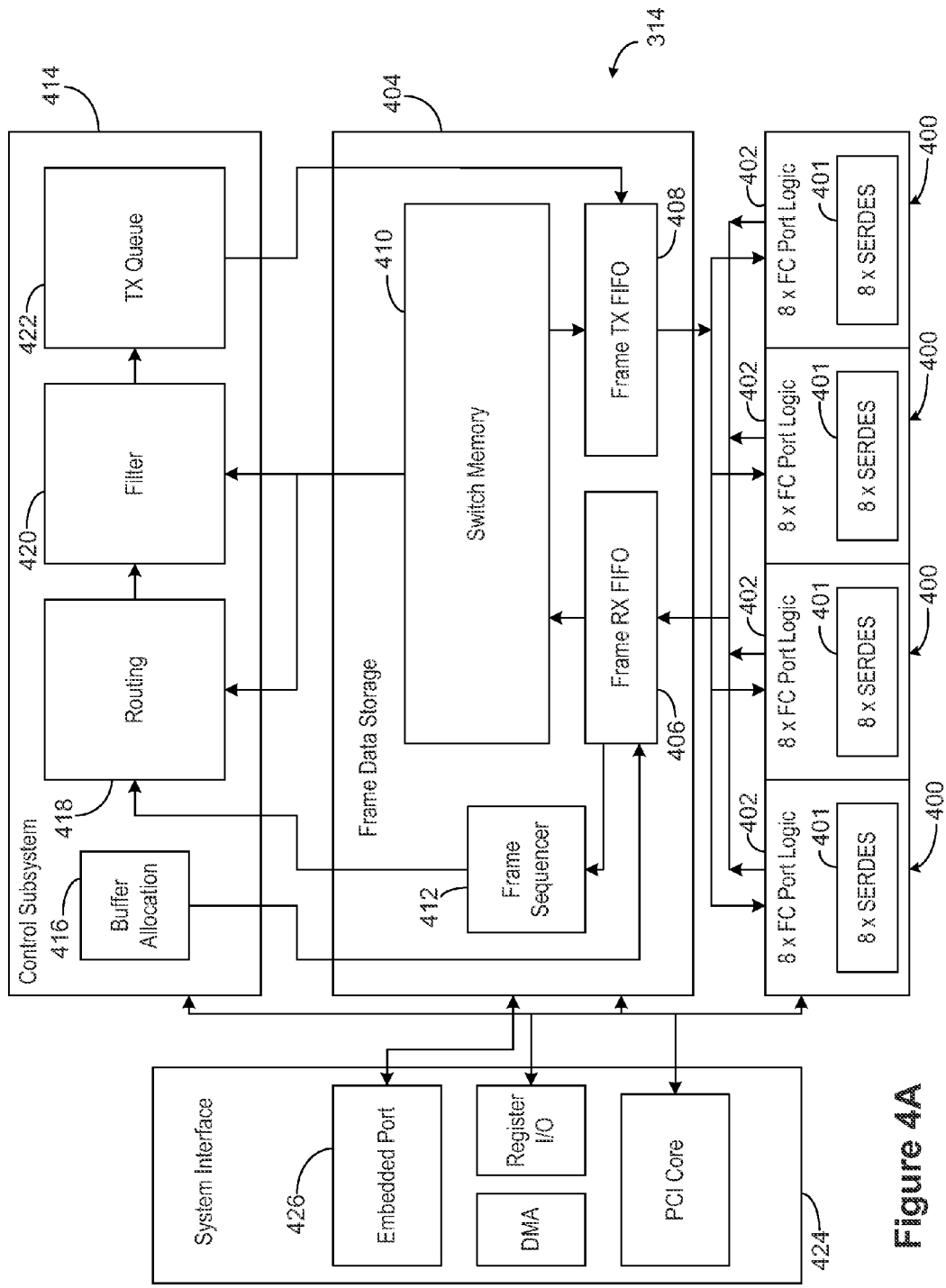
FIG. 4A is a block diagram of a Fibre Channel circuit according to an embodiment of the invention.

FIG. 4A illustrates a simplified block diagram of one embodiment of a Fibre Channel circuit 314. The Fibre Channel circuit 314 includes four identical Fibre Channel port groups or receiver/transmitter circuits 400, each circuit 400 having eight Fibre Channel ports, for a total of 32 Fibre Channel ports. Each circuit 400 includes eight copies of Fibre Channel port logic 402 and eight SERDES serial links 401. Typically, SERDES serial links 401 are located on-chip to save overall board space.

The four circuits 400 are connected to a frame data storage circuit 404. The circuit 404 includes frame receive (RX) and transmit (TX) FIFOs 406 and 408 connected between the circuits 400 and switch memory 410. The switch memory 410 holds the frames which are being operated on or are waiting to be transmitted. The frame RX FIFO 406 is also connected to a frame sequencer circuit 412.

The frame data storage circuit 404 is connected to control subsystem circuitry 414. The control subsystem circuitry 414 includes a buffer allocation block 416, a routing block 418, a filter block 420, and a queue block 422. Briefly, the buffer allocation block 416 determines available buffer locations in the switch memory 410 and provides this information to the frame RX FIFO 406. The frame sequencer circuit 412 provides buffer location values to the routing block 418, which then receives the frame header to perform routing determinations. These routing determinations are used to provide the receive and transmit ports, the receive and transmit virtual channels, and other information to the filter block 420. The filter block 420 uses the provided information and retrieves a copy of the frame header and performs filtering operations according to the invention and as described below in more detail. The transmit queue block 422 receives the routing information as potentially modified by the filtering logic 420, and provides the routing information for each buffer location to the frame TX FIFO 408 to allow the frame to be properly transmitted.

A system interface circuit 424 provides an interface between the processor 302 and the remaining portion of the circuit 314. The interface circuit 424 includes an embedded port 426 to allow the processor 302 to send and receive frames.

Figure 4B:
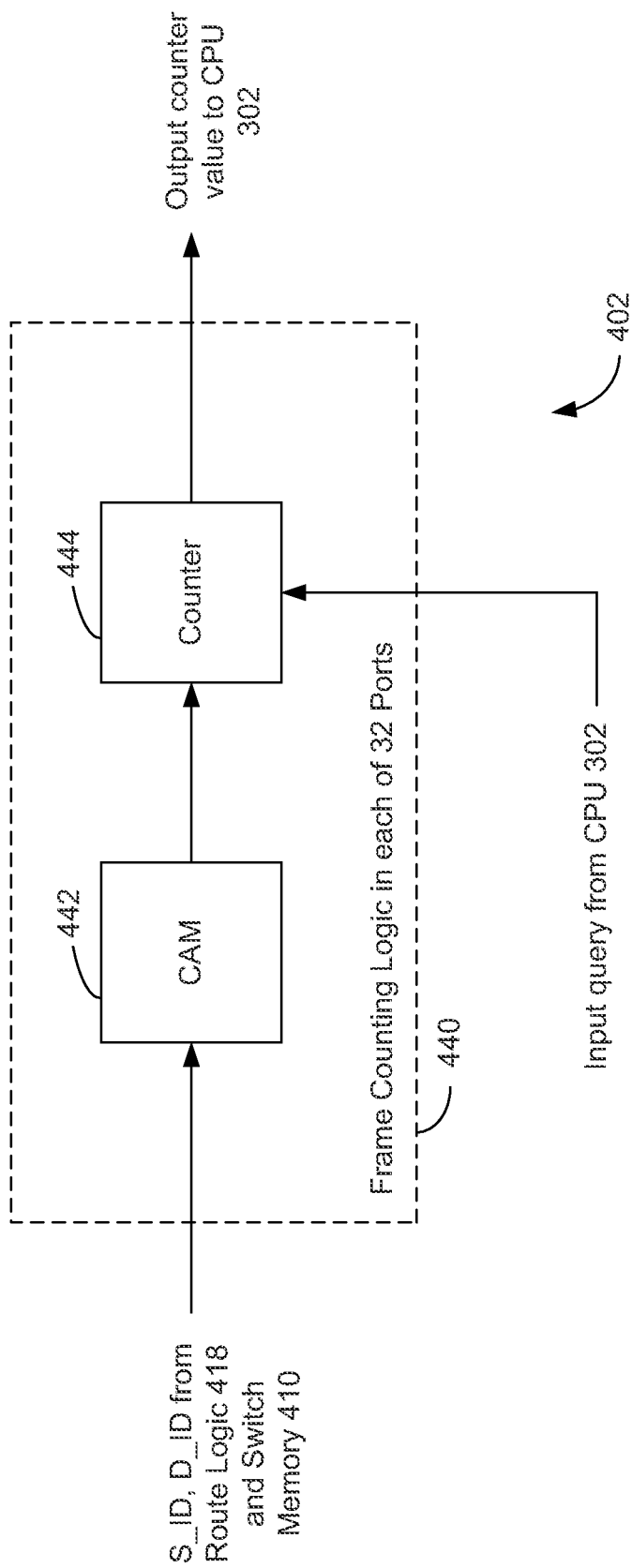
FIG. 4B is a block diagram of frame counting logic in a Fibre Channel circuit according to an embodiment of the invention.

Frame counting is accomplished through frame counting logic 440 in Fibre Channel port logic 402. In FIG. 4B, a block diagram of an embodiment for the logic of frame counting logic 440 suitable for counting frames in accordance with the invention is shown. Frame counting logic 440 receives various fields from a transmitted frame and uses them, when applicable, to count the frame. In the embodiment shown, the frame counting logic 440 is chip-based logic and present in each of the 32 ports in the circuit 314, although it will be understood by one of skill in the art that the counting logic may be designed to support fewer ports. Further, in a preferred embodiment, frame counting logic 440 is capable of counting up to 256 frame flows at a time in a given direction. However, depending on factors such as the hardware resources and the size of the fabric, the number of countable flows may be changed.

Frame counting logic 440 includes a content-addressable memory (CAM) 442 and a counter 444. The CAM 442 receives frame information (from, e.g., a frame header) to determine whether a frame is to be counted. Specifically, the CAM 442 receives at least a source ID (S_ID) and a destination ID (D_ID) from the Fibre Channel port logic 402. The counter 444 includes a plurality of hardware counters, each of which is configurable to count a particular frame flow (i.e., a S_ID, D_ID pair) when triggered by an output from the CAM 442. The processor 302 programs the CAM 442 for the desired frame flows, described below.

Thus, the counting logic 440 is used to find specific frame fields representing frame flows that are to be monitored by port monitor 225. This is done by using CAM 442, which contains a collection of frame fields corresponding to the source and destination addresses to be counted by port monitor 225. One manner for counting frame flows in the port monitor 225 is discussed as follows. CAM 442 lists pairs of S_IDs and D_IDs that correspond to frame flows to be counted. For a frame transmitted through switch 220, the S_ID and the D_ID fields are captured as they are received at the Fibre Channel port logic 402. These S_ID, D_ID pairs are compared to the predefined entries in the CAM 442. When there is a match (i.e., a CAM hit) for a S_ID, D_ID pair in the CAM 442, an address corresponding to that frame flow is output to counter 444. The address, received by counter 444, provides an index to a hardware counter in counter 444, which is incremented upon receipt of the address. If no match is found, none of the hardware counters in counter 444 are incremented.

Counter 444 is also configured to receive an input query from CPU 302. An input query allows the CPU 302 to receive from counter 444 a count of frame flows that are monitored and counted by frame counting logic 440. In a preferred embodiment, a read command from CPU 302 resets the hardware counters in counter 444. However, other actions may trigger a reset of the hardware counters in counter 444. For example, the hardware counters may be reset at predetermined times or the counters may simply roll over, with the software recognizing this occurrence.

One skilled in the art will appreciate that while a single CAM 442 and counter 444 is shown in the counting logic 440 of FIG. 4B for purposes of explanation, other embodiments are possible which do not depart from the scope of the invention. For example, CAM 442 may be divided into a S_ID CAM and a D_ID CAM, each of which detect source addresses and destination addresses, respectively, to be counted. In such an embodiment, combination logic combines source addresses and destination addresses into frame flows that are to be counted before passing an appropriate command to the counter to increment for that flow. Further, masking logic may be provided to more easily allow address ranges to be counted if desired.

The above examples are simplified for explanation purposes. In many cases it would be desirable to duplicate any stored data for redundancy reasons. For example, the switch 300 may include a storage device (e.g., a hard drive), and the various devices in the switch can then send the logged data to a logical unit internal to the switch 300. Alternatively, the devices may send the data elsewhere in the network (e.g., external storage).

Figure 5:
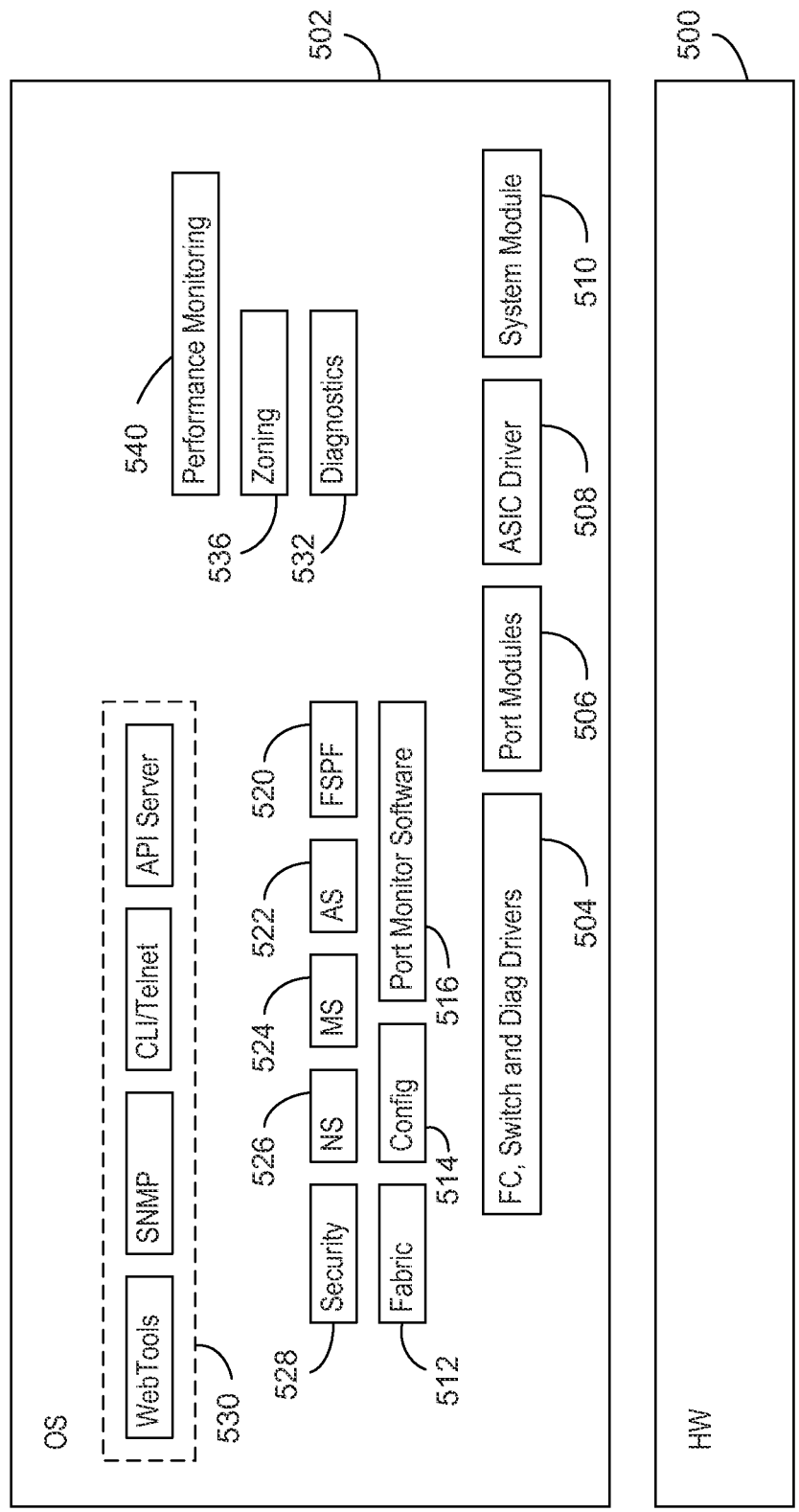
FIG. 5 is an illustration of software modules in a switch according to an embodiment of the invention.

Proceeding to FIG. 5, a general block diagram of the switch 300 hardware and software is shown. Block 500 indicates the hardware as previously described. Block 502 is the basic software architecture of the switch. This may be viewed as the operating system of the switch and all of the particular modules or drivers that are operating within the switch. Modules operating on the operating system 502 are Fibre Channel, switch, and diagnostic drivers 504; port modules 506, if appropriate; a driver 508 to work with the Fibre Channel ASIC; and a system module 510. Other switch modules include a fabric module 512, a configuration module 514, port monitor software 516, an FSPF or Fibre Shortest Path First routing module 520, an AS or alias server module 522, an MS or management server module 524, a name server module 526 and a security module 528. Additionally, the normal switch management interface 530 is shown including web server, SNMP, telnet and API modules. The operating system 502 additionally includes a diagnostics module 532, a zoning module 536 and a performance monitoring module 540. Port monitor software 516 contains the software that controls the port monitor hardware discussed above (i.e., for counting frame flows).

Figure 6:
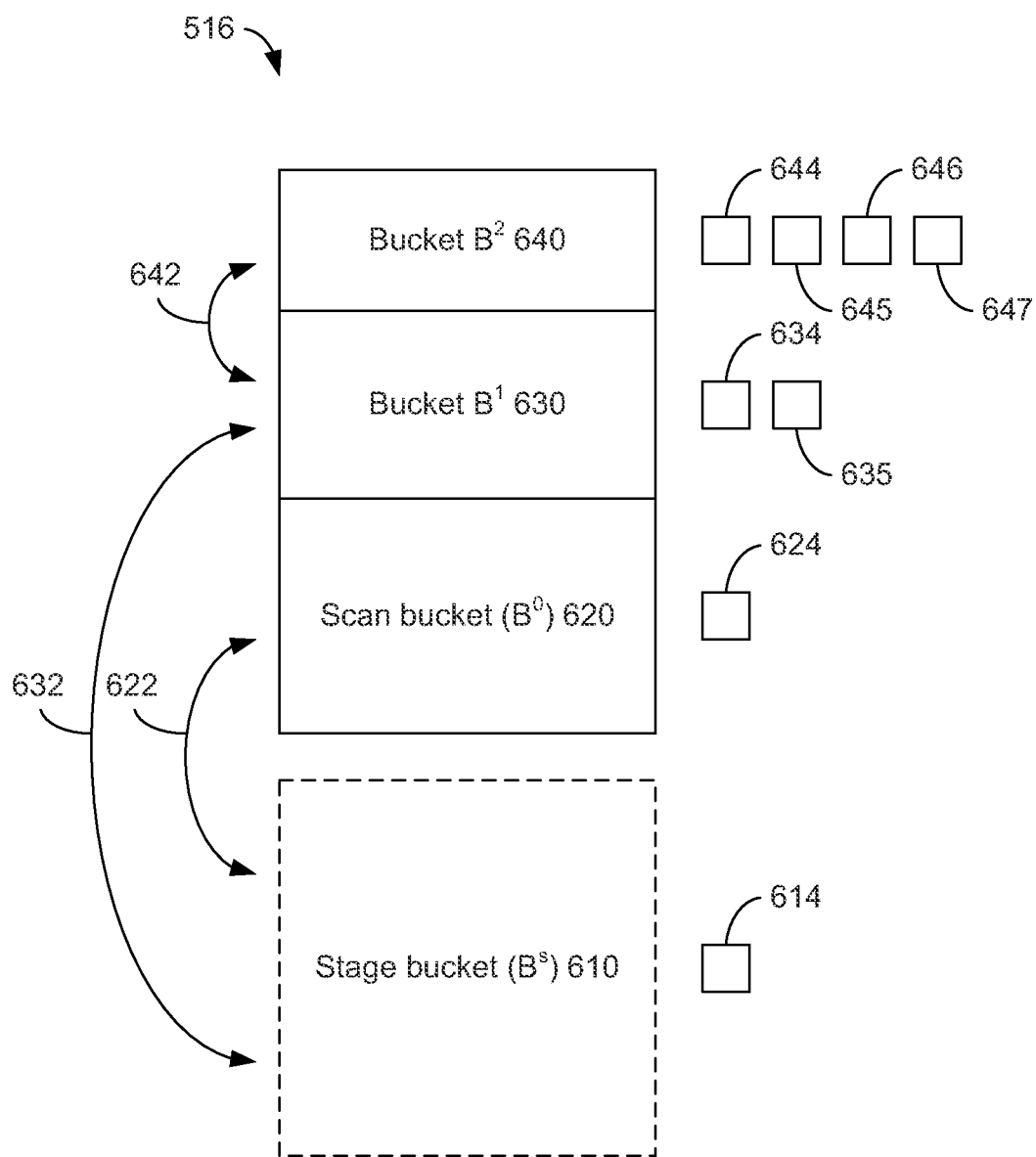
FIG. 6 is an illustration of a partitioning of software resources in a switch according to an embodiment of the invention.

FIG. 6 illustrates a block diagram of a configuration of resources of the port monitor software 516 according to one embodiment of the invention. As discussed above, the frame counting logic 440 has been configured to count a predetermined number of S_ID, D_ID frame flows. In the embodiment shown in FIG. 6, a portion of the port monitor software 516 corresponding to hardware counting resources in the frame counting logic 440 have been partitioned by the port monitor software 516 into three logical containers referred to as buckets: $B^2$ 620, $B^1$ 630, and $B^0$ 640. The port monitor software 516 has also partitioned a fourth bucket (the "scan bucket") $B^s$ 610. Each frame flow monitored by port monitor hardware (i.e., counted by frame counting logic 440 shown in FIG. 4B) is placed in one of the buckets corresponding to hardware filtering resources (620, 630, 640) when the hardware counters are read by CPU 302. Each bucket may be viewed as a bin, in which various frame flows are recorded and sorted based on the activity of the frame flows. Activity of a frame flow may be defined, for example, in terms of the number of frames counted, the number of bytes sent, or other similar characteristics.

As discussed above, in one embodiment according to the invention, up to 256 frame flows may be counted by the frame counting logic 440 shown in FIG. 4B. By selectively programming which frame flows are counted by the frame counting logic 440 and storing these counts in the different buckets 610, 620, 630, and 640, the port monitor software 516 can monitor the activity level of any number of frame flows associated with switch 220. The number of frame flows monitored and the designation of which frame flows are monitored may be configured by an administrator based on hardware and software characteristics of the switch.

Buckets 620, 630, and 640 continually record the counts of frame flows in the hardware counters corresponding to each respective bucket. At particular time intervals, referred to as ticks, counts for each frame flow are logged in the buckets 620, 630, and 640, corresponding to the hardware counters. A tick may be viewed as a base counter interval upon which operations related to port monitoring occur (i.e., an activity timer). In one embodiment of the invention, a tick is a one-second interval. However, this interval may be changed as convenient or necessary for the operation of a switch. For example, upon startup of a switch, the time interval for a tick may be reduced to 0.1 seconds until all frame flows have established at least one count value. Such a configuration enables the switch to quickly and efficiently approximate the number of frame flows passing through the switch.

Frame flows are exchanged between the buckets at regular integer multiples of a tick. For example, at every tick, frame flows are exchanged between the scan bucket $B^0$ and the stage bucket $B^s$. Although the tick interval for each bucket may be identical, these tick intervals need not be identical, and different time amounts may be used for different ticks. For example, a tick may be designated as one second for the scan bucket $B^0$ and the stage bucket $B^s$, two seconds for bucket $B^1$, and 4 seconds for bucket $B^2$.

The stage bucket $B^s$ 610, holds all frame flows that cannot fit into the space allocated for counting frame flows in the buckets 620, 630, and 640 corresponding to the hardware counters. The stage bucket $B^s$ 610 may thus be viewed as overflow storage for frame flows that cannot fit into buckets 620, 630, and 640. As the stage bucket $B^s$ 610 is in software, but does not correspond to specific hardware counters, virtually no limit exists with regard to the number of frame flows that can be assigned to it. Practical limits may be imposed by memory or processor utilization. Over time, some of the frame flows in the stage bucket $B^s$ 610 may be moved to other buckets by exchanging these flows with flows in buckets 620, 630, and 640.

The scan bucket $B^0$ 620 has allocated thereto a particular number of hardware monitoring resources (in frame counting logic 440). This allocation may be programmed by an administrator using the port monitor software 516. The scan bucket $B^0$ 620 is configured to record counts of frame flow activity for a subset of frame flows in the stage bucket $B^s$ 610. At particular time intervals (e.g., every tick), these counts are recorded from the frame counting logic 440, and frame flows are exchanged between the stage bucket $B^s$ 610 and the scan bucket $B^0$ 620. Thus, activity for each frame flow in the scan bucket $B^0$ 620 in a given time interval is counted by the hardware for that time interval. Then, at the end of the time interval, the frame flows in the scan bucket $B^0$ 620 are exchanged with flows in the stage bucket $B^s$ 610 (represented by arrow 622). Typically, the scan bucket $B^0$ 620 exchanges frame flows only with the stage bucket $B^s$ 610, as the scan bucket updates counts for each frame flow in the stage bucket $B^s$ 610. In this manner, a stored count for each frame flow is kept current to reflect the actual activity for that flow.

The remaining buckets corresponding to the hardware counters (630 and 640) also have allocated a particular number of counting resources, which may be programmed by an administrator using the port monitor software 516. No more than a single bucket corresponding to any of the hardware counters (e.g., only one of 620, 630, and 640) owns a particular hardware counting resource at the same time. In other words, no frame flow in the hardware frame counting logic 440 should be assigned to more than one bucket at a given time. Each bucket 630 and 640 is configured to record data counts associated with activity of the frame flows assigned to that bucket. Thus, like the scan bucket $B^0$ 620 discussed above, buckets 630 and 640 record data counts from frame flows counted by frame counting logic 440 at every tick interval.

An example to illustrate the coordination of port monitor hardware and software is discussed with reference to FIGS. 2, 4B, and 6 of the application. To illustrate, if a frame flow from device 214 to device 231 is assigned to bucket $B^1$ 630, activity for this flow (from device 214 to device 231) is continuously monitored by CAM 442, and occurrences of this flow are counted by a hardware counter in counter 444. At every tick, a count corresponding to the monitored activity is recorded in bucket $B^1$ 630. Based on the recorded frame flow activity for a given flow, a flow may move from one bucket to another as shown by arrows 632 and 642.

Typically, the space allocated for frame flows (i.e., the number of frame flows that are countable) decreases as one transitions from the stage bucket $B^s$ 610 to the scan bucket $B^0$ 620, to bucket $B^1$ 630, and to bucket $B^2$ 640. Thus, among the stage bucket $B^s$ 610, the scan bucket $B^0$ 620, bucket $B^1$ 630, and bucket $B^2$ 640, the stage bucket $B^s$ 610 has the highest number of frame flows assigned to it. This number of frame flows is effectively all of the flows except the flows in bucket $B^1$ 630 and bucket $B^2$ 640. Frame flows assigned to the scan bucket $B^0$ 620 may be viewed as a subset of the frame flows in the stage bucket $B^s$ 610, as these flows are exchanged at regular intervals with the flows in the stage bucket $B^s$ 610. In one or more embodiments according to the invention, frame flows in the scan bucket $B^0$ 620 are duplicated from the stage bucket $B^s$ 610 rather than exchanged, as these flows are simply updated for the stage bucket $B^s$ 610 on a rolling basis.

The scan bucket $B^0$ 620 has fewer frame flows assigned to it than the stage bucket $B^s$ 610, bucket $B^1$ 630 has fewer frame flows assigned to it than the scan bucket $B^0$ 620, and bucket $B^2$ has the fewest number of frame flows assigned to it. This allows a hierarchy to be established in which more active frame flows (i.e., flows with relatively higher numbers of counts in hardware) move to higher-ranked buckets. In general, subject to the constraints discussed above, a count is made for all frame flows in two neighboring buckets, a comparison is made between the frame flow counts in the neighboring buckets, and the frame flows with relatively higher counts move to higher ranked buckets. Similarly, frame flows with relatively lower counts move to lower ranked buckets.

Associated with the stage bucket $B^s$ 610, the scan bucket $B^0$ 620, bucket $B^1$ 630, and bucket $B^2$ 640, respectively, are counter registers 614, 624, 634-635, and 644-647. Counts of frame flow activity for each tick are recorded in counter registers 614, 624, 634-635, and 644-647. For example, as seen in FIG. 6, bucket $B^2$ maintains the last 4 counts of frame flows in counter registers 644-647. Similarly, bucket $B^1$ maintains the last 2 counts of frame flows in counter registers 634 and 635. The scan bucket $B^0$ 620 and the stage bucket $B^s$ 610 maintain only one count of frame flows in count registers 624 and 614, respectively.

Depending on the hardware and software resources available, any number of buckets may be allocated to the counting resources in a monitor. In other words, while three buckets are shown corresponding to the hardware counters in the exemplary embodiment of FIG. 6, any number of buckets may be used without departing from the scope of the invention. Monitors, and the buckets comprising the monitors, are configured by a user through the software 502. Further, as discussed above, depending on the hardware and software resources available, any number of monitors may be instantiated. For example, as seen with respect to FIG. 2, while port monitor 225 is connected to the E_port of switch 220 that is connected to switch 210, another port monitor may be connected to the E_port of switch 220 that is connected to switch 230, if resources allow such a connection.

Figure 7:
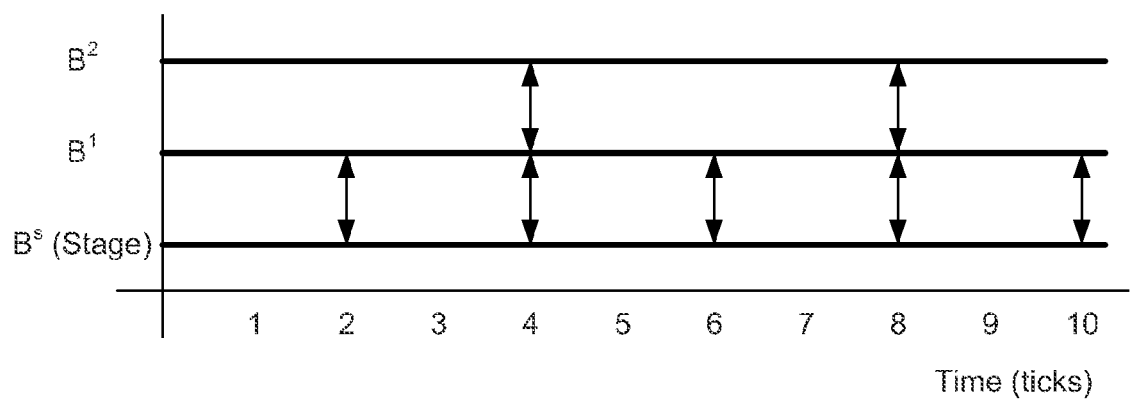
FIG. 7 is a timing diagram illustrating when different frame flows are compared in accordance with an embodiment of the invention.

FIG. 7 shows a timing diagram for the invention as described with reference to FIG. 6. More specifically, FIG. 7 illustrates at what time intervals frame flows are compared between buckets. From FIG. 7, is apparent that bucket 1 ($B^1$) 630 compares frame flow values with the Stage bucket ($B^s$) 610 every two ticks. Similarly, bucket 2 ($B^2$) 640 compares frame flow values with bucket 1 ($B^1$) 630 every 4 ticks. In general, a given bucket n compares values with the next lower bucket n−1 every $2^n$ ticks. Thus, although not shown in FIG. 6 or 7, an additional bucket (e.g., bucket 3) would compare frame flow values with the next lower bucket, bucket 2, every 8 ticks. Further, while intervals of $2^n$ have been shown for each bucket, the interval may be changed without departing from the scope of the invention. For example, instead of comparing frame flows every $2^n$ ticks, flows may be compared every n ticks, every $n^2$ ticks, etc.

Thus, the movement of frame flows between buckets is based on a confidence building algorithm such that the thrashing of frame flows between buckets is reduced. In other words, a frame flow moves to a higher bucket only as adequate confidence is gained that the flow should move to a higher bucket. Other methods exist and may be implemented in one or more embodiments of the invention to help reduce thrashing. For example, hysteresis may be added to a frame flow of a higher bucket (or subtracted from a frame flow of a lower bucket) to reduce thrashing. Hysteresis helps eliminate the frequent exchange of flows with similar counts between neighboring buckets.

Figure 8:
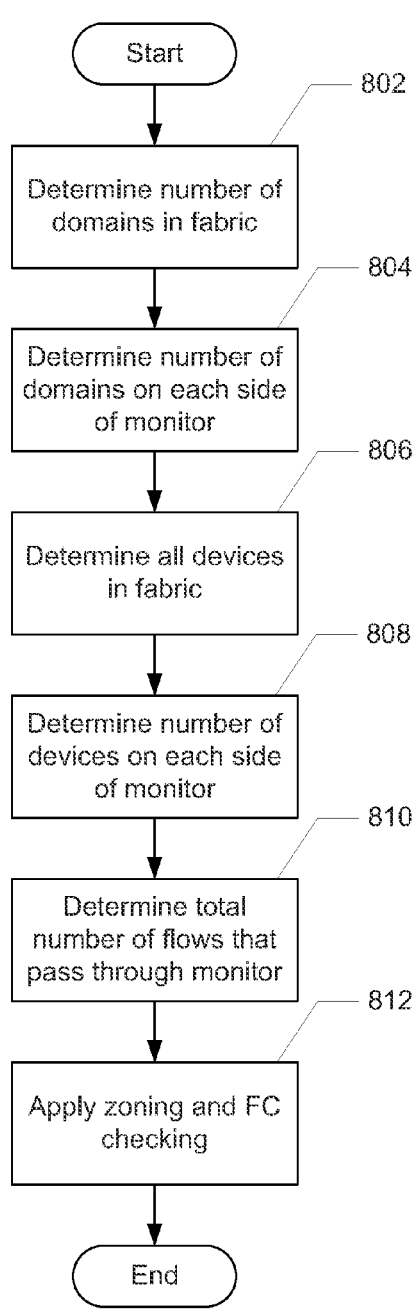
FIG. 8 is a flowchart illustrating one method for determining a number of zones in accordance with an embodiment of the invention.

FIG. 8 illustrates one embodiment of a process by which possible frame flows through a given network are determined. The process begins by determining the number of domains in the fabric (802), such as by querying the FSPF routing module 520 or the name server module 526. Then, the number of domains on one side of the port is determined. By simply subtracting this number from the total number of domains in the fabric, the number of domains on the other side of the port is determined. Once all domains in the fabric are determined (804), all the devices in the fabric are located (806), again by querying the FSPF routing module 520 or the name server module 526. Upon determining all devices in the fabric, all devices on one side of the port being monitored are determined (808). This may be accomplished by, for example, checking the Fibre Channel addresses of each of the devices against the groups of domains previously determined.

Determination of the number of possible frame flows passing through a given monitor is a result of multiplying the number of devices on one side of the monitor by the number of devices on the other side of the monitor (810). The above number of frame flows may be reduced by applying constraints such as zoning or Fibre Channel type checking (812). As events may occur in a fabric that affect the number of frame flows, the monitor additionally accounts for these events and changes the frame flow database accordingly. Events that may affect the number of frame flows include, but are not limited to: changing the local domain, adding or removing a domain, a new device logging in or an existing device logging out of a domain, or a local environment change, such as the switch on which the monitor is installed becoming operational or non-operational.

Figure 9:
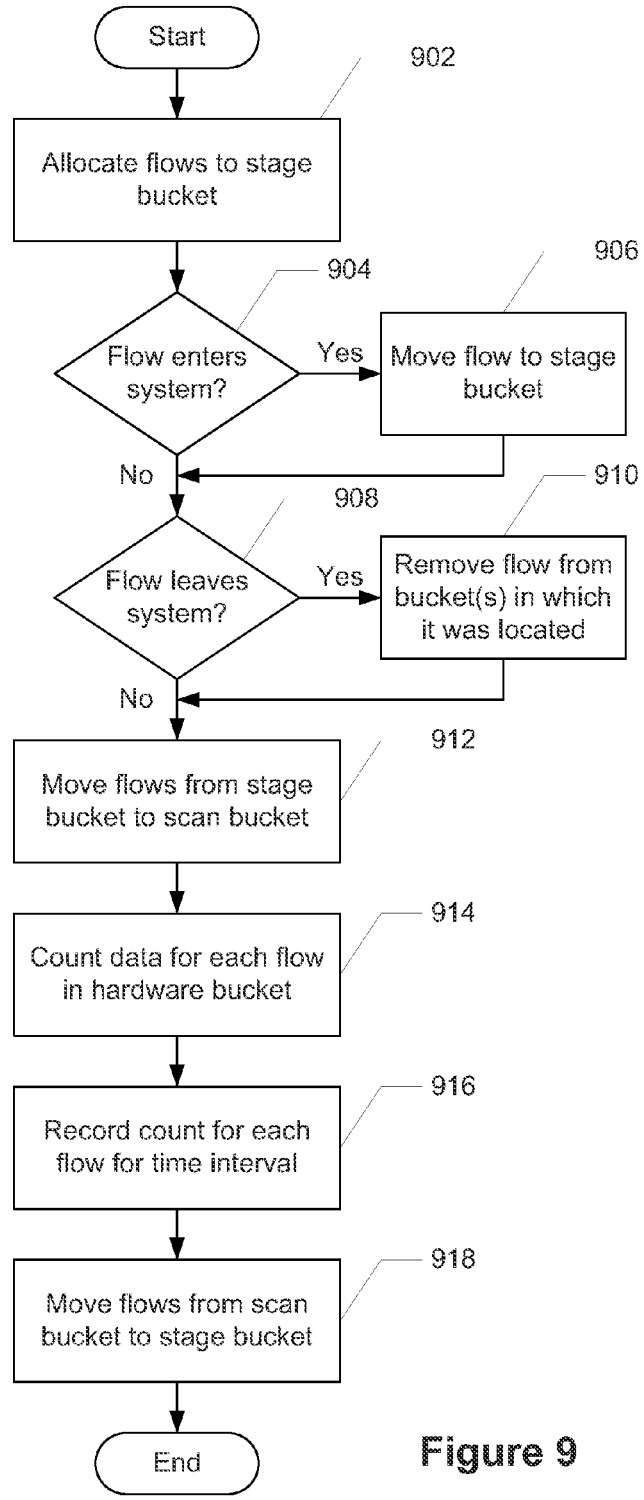
FIG. 9 is a flowchart illustrating one method for counting data for frame flows in accordance with an embodiment of the invention.

FIG. 9 illustrates one embodiment of a process by which frame flows are counted. Initially, a group of frame flows 'n,' which exist in a fabric, is known. These frame flows are placed in the Stage bucket $B^s$ of the monitor (902). On startup of the switch, it is typically assumed that the Scan bucket $B^0$ is initially empty; however, if the Scan bucket $B^0$ is not empty, the scan bucket $B^0$ may be cleared, or any frame flows in the Scan bucket $B^0$ may be moved from the Scan bucket $B^0$ to the Stage bucket $B^s$. Additionally, at any time in the process, a frame flow that enters the system may be moved to the Stage bucket $B^s$ (904, 906), and similarly, any frame flows that leave the system may be removed from any bucket in which it was located, which could be any bucket in the system (e.g., the Stage bucket 610, Bucket $B^2$ 640, etc.) (908, 910).

Periodically, a certain number of frame flows 'x' are moved from the Stage bucket $B^s$ to the Scan bucket $B^0$ (912). The time period may be, for example, every tick interval in the switch. Generally, the number 'x' is equivalent to the number of frame flows that can fit into the Scan bucket $B^0$ (i.e., the depth of the Scan bucket $B^0$). Each frame flow in the Scan bucket $B^0$ is then monitored, and frame flow activity is counted for the duration of the time period that the frame flow is in the hardware (914). In other words, each frame flow in the Scan bucket $B^0$ is assigned to a hardware counting resource, which counts occurrences of the frame flow until the hardware counting resource is reassigned by software. At the end of the time interval, the hardware counts for each frame flow are recorded (916) in the Scan bucket $B^0$, and the frame flows that were in the scan bucket $B^0$ are moved back to the stage bucket $B^s$ (918).

Figure 10:
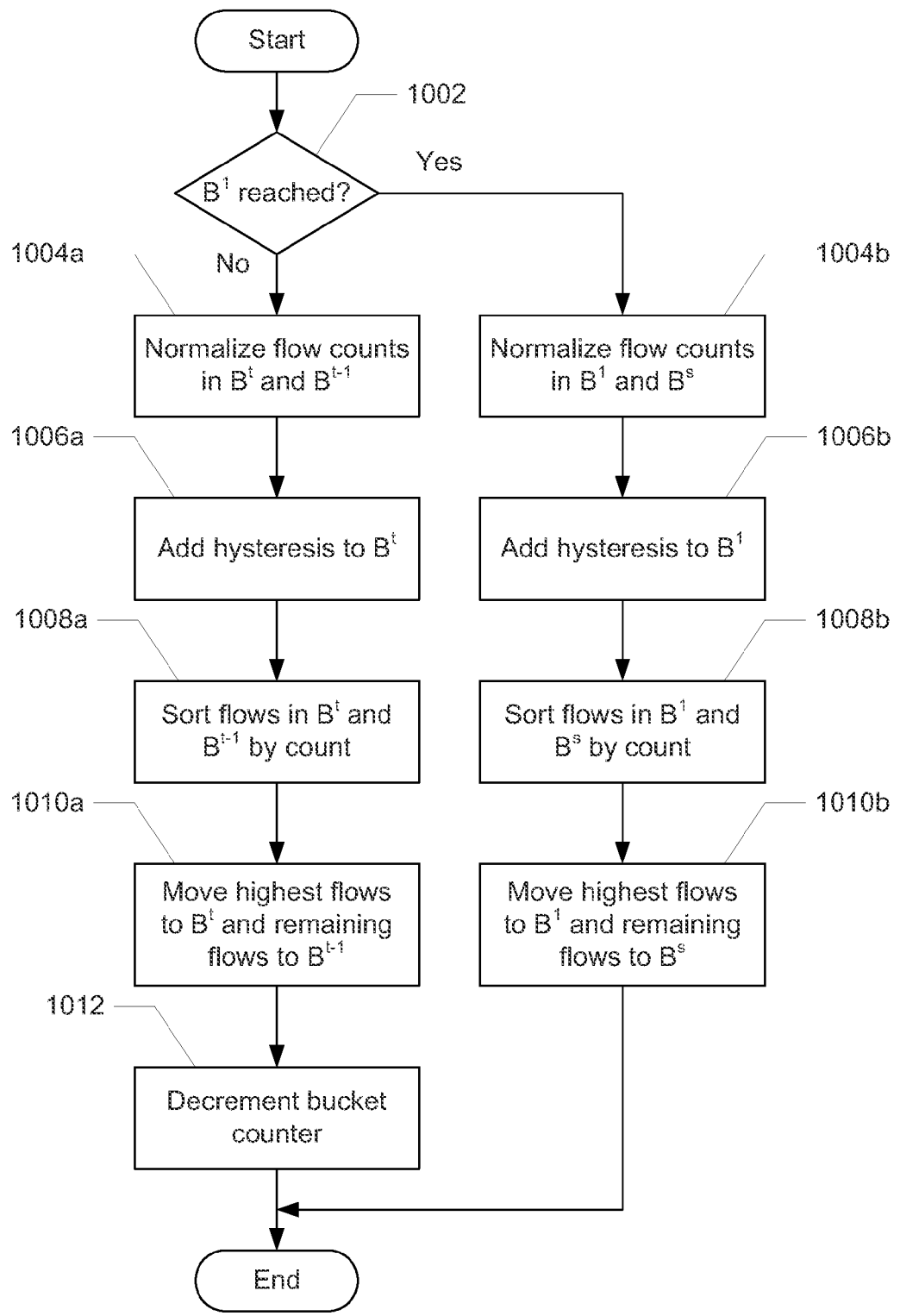
FIG. 10 is a flowchart illustrating one method for sorting frame flows in accordance with an embodiment of the invention.

FIG. 10 shows one embodiment of a process by which frame flows are sorted in the logical software buckets. Generally, this process applies to all buckets; the process is modified slightly when the last bucket above the scan bucket $B^0$ (e.g., $B^1$)) is reached, which is detailed below.

A determination is made as to whether bucket $B^1$ is reached (1002), and if $B^1$ is not yet reached, the frame flow counts in the current bucket $B^t$ and the next lower bucket $B^{t-1}$ are normalized (1004a). Normalization of the values helps account for the fact that higher buckets are compared less often than lower buckets. Normalization may be accomplished in a number of ways. For example, in one embodiment of the invention, all frame flow counts of bucket $B^{t-1}$ are compared to the corresponding frame flow counts of the higher bucket $B^t$. Thus, even though $B^t$ has a larger number of recorded frame flow counts than $B^{t-1}$, an equivalent number of frame flow counts are compared for the two buckets. Generally, for the current bucket $B^t$ and the next lower bucket $B^{t-1}$ to which $B^t$ is compared, this technique of normalization may be accomplished by adding the counts for the last (t−1) ticks for each frame flow in the buckets and dividing the counts by (t−1). Another possible technique for normalization is taking a weighted average of the number of samples available. Briefly, this technique includes averaging the counts for each frame flow over however many sets of counts are available for that flow. In other words, if a flow has counts recorded for (t−1) ticks, then the total of the counts is divided by (t−1).

Next, hysteresis is added to the current bucket $B^t$ (1006a). This is accomplished by, for example, adding a predetermined number of counts to frame flows in the current bucket $B^t$. In other embodiments of the invention, the number of counts for each frame flow may be multiplied by a scaling factor. Hysteresis helps prevent flows in different buckets with similar counts from repeatedly and unnecessarily exchanging buckets.

At this point, a sort of the frame flow counts in each bucket is performed (1008a). All frame flows, including those in the current bucket $B^t$ and those in the next lower bucket $B^{t-1}$, are sorted together. The highest ranked frame flows that fit into the current bucket $B^t$ are moved to $B^t$, and the remaining frame flows are moved to the next lower bucket $B^{t-1}$ (1010a).

The above process discussed with respect to FIG. 10 is repeated for each bucket in a switch. Accordingly, a bucket counter is decremented after each sorting process is complete (1012). In other words, after the process is complete for two buckets $B^t$ and $B^{t-1}$, the process may be repeated for $B^{t-1}$ and $B^{t-2}$, and repeated until there are no more buckets for which frame flows are to be compared. As seen with respect to FIG. 7, this process may begin at any bucket, depending on the time at which the process begins.

As mentioned above, the process is modified slightly when the next-to-lowest bucket (the bucket above the scan bucket $B^0$, which is $B^t$ in FIG. 6) is reached. Specifically, as discussed above, the scan bucket $B^0$ exchanges frame flows with the stage bucket, $B^s$, in software (1004b). This allows current counts to be maintained for each frame flow in the stage bucket, $B^s$. Accordingly, the next-to-lowest bucket (e.g., $B^t$ in FIG. 6) does not compare frame flows with the lowest bucket. Rather, the next-to-lowest bucket compares frame flows with the stage bucket $B^s$ in software. In more general terms, with reference to the process discussed above, $B^0$ is considered the current bucket $B^t$, while the stage bucket $B^s$ is considered the next lower bucket $B^{t-1}$. Similar to the above discussion, hysteresis is added (1006b), the frame flows are sorted (1008b), and the frame flows are moved to the appropriate bucket (1010b).

This "top-to-bottom" flow analysis allows a frame flow to move from the topmost bucket e.g., bucket $B^2$ as shown in FIG. 6) to the lowest-ranked bucket (e.g., the stage bucket $B^s$) in a single sort cycle, but prevents a single frame flow from rising more than one bucket in a single sort cycle. In other words, confidence derived from multiple sort cycles is required for a frame flow to move from a low-ranked bucket such as the stage bucket to a high-ranked bucket such as bucket $B^2$ shown in FIG. 6. Further, the port monitor allows real-time analysis of frame flows and determination of frame flows that are major users of Fibre Channel bandwidth.

As discussed above, while the foregoing disclosure of various embodiments according to the invention have been discussed with respect to Fibre Channel protocol, it will be understood by one of skill in the art that the various embodiments discussed according to the invention may be implemented using any network protocol, provided that the network protocol allows for determining a source identification and a destination identification of data associated with a flow in hardware, and provided that the protocol allows for counting data associated with a flow. Further, of course, a channel supporting the protocol will be capable of carrying more than a single flow at a given time.

One or more embodiments according to the invention operate on or work in conjunction with an information system. Such an information system may be an entire frame flow counting information system as described above or only portions of such a system. For example, one or more embodiments according to the invention can operate with an information system that need only be a communications network in the simplest sense to detect and route information. Moreover, instructions may be executed in a single processor or conveyed between nodes in the communications network to perform certain algorithms and operations. Thus, one or more embodiments of the invention are capable of operating with any information system, from those with minimal functionality to those providing all of the functionality disclosed herein.

The foregoing disclosure and description of the invention are illustrative and explanatory, and various changes in the size, shape, materials, components, circuit elements, wiring connections and contacts, as well as in the details of the illustrated circuitry and construction and method of operation may be made without departing from the spirit of the invention.

What is claimed is:

1. A method comprising:
counting every frame of a first set of a plurality of flows and of a portion of a second set of said plurality of flows over a first time period;
selecting flows from said plurality of flows for inclusion in said first set and said second set; and
changing said portion of said second set counted so that each flow in said second set is periodically counted every frame over a second time period.

2. The method of claim 1, wherein said first set of flows has higher flow rates than said second set of flows.

3. The method of claim 2, wherein said selecting is based on flow rates of frames.

4. The method of claim 1, said first set has same number of hardware counters associated with it for counting frames as there are frame flows in said first set.

5. The method of claim 1, wherein said second set has a smaller number of hardware counters associated with it for counting frames than there are frame flows in said second set.

6. The method of claim 5, wherein a content-addressable memory associates each frame flow having an associated hardware counter to the associated hardware counter.

7. The method of claim 1, wherein selecting flows from said plurality of flows for inclusion in said first set comprises selecting frame flows with the highest count values for said first set.

8. The method of claim 7, further comprising selecting the remaining flows for inclusion in said second set.

9. The method of claim 1, wherein said first set of flows is smaller than the second set.

10. A non-transitory computer readable storage medium storing instructions, the instructions when executed causing a processor to:
count every frame of a first set of a plurality of flows and of a portion of a second set of said plurality of flows over a first time period;
select flows from said plurality of flows for inclusion in said first set and said second set; and
change said portion of said second set counted so that each flow in said second set is periodically counted every frame over a second time period.

11. The non-transitory computer readable storage medium of claim 10, wherein said first set of flows has higher flow rates than said second set of flows.

12. The non-transitory computer readable storage medium of claim 11, wherein said selecting is based on flow rates of frames.

13. The non-transitory computer readable storage medium of claim 10, wherein said first set has same number of hardware counters associated with it for counting frames as there are frame flows in said first set.

14. The non-transitory computer readable storage medium of claim 13, wherein a content-addressable memory associates each frame flow having an associated hardware counter to the associated hardware counter.

15. The non-transitory computer readable storage medium of claim 10, wherein said second set has a smaller number of hardware counters associated with it for counting frames than there are frame flows in said second set.

16. The non-transitory computer readable storage medium of claim 10, wherein selecting flows from said plurality of flows for inclusion in said first set comprises selecting frame flows with the highest count values for said first set.

17. The non-transitory computer readable storage medium of claim 16, wherein the instructions when executed further cause the processor to select the remaining flows for inclusion in said second set.

18. The non-transitory computer readable storage medium of claim 10, wherein every frame of the first set of the plurality of flows is counted more frequently than the portion of the second set.

19. A network device comprising:
a processor;
memory operatively connected to said processor to store software programs and data;
detection logic configured to detect selected values in portions of each frame in each of a plurality of frame flows;
a plurality of hardware counters operatively coupled to said processor and operatively connected to said detection logic and configured to count every frame of selected frame flows; and
a software program stored in said memory to be executed by said processor to:
configure said plurality of hardware counters to count every frame of a first set of said plurality of flows and of a portion of a second set of said plurality of flows over a first time period;

select flows from said plurality of flows for inclusion in said first set and said second set; and configure said plurality of hardware counters with said portion of said second set counted every frame so that each flow in said second set is periodically counted every frame over a second time period.

20. The network device of claim 19, wherein said first set of flows has higher flow rates than said second set of flows.

21. The network device of claim 20, wherein said selecting is based on flow rates of frames.

22. The network device of claim 19, wherein every frame of the first set of the plurality of flows is counted more frequently than the portion of the second set.

* * * * *